April 29, 1930.   S. M. KELLOGG   1,756,790
DRIVING BELT FOR CONE PULLEYS
Filed Aug. 23, 1926   2 Sheets-Sheet 1
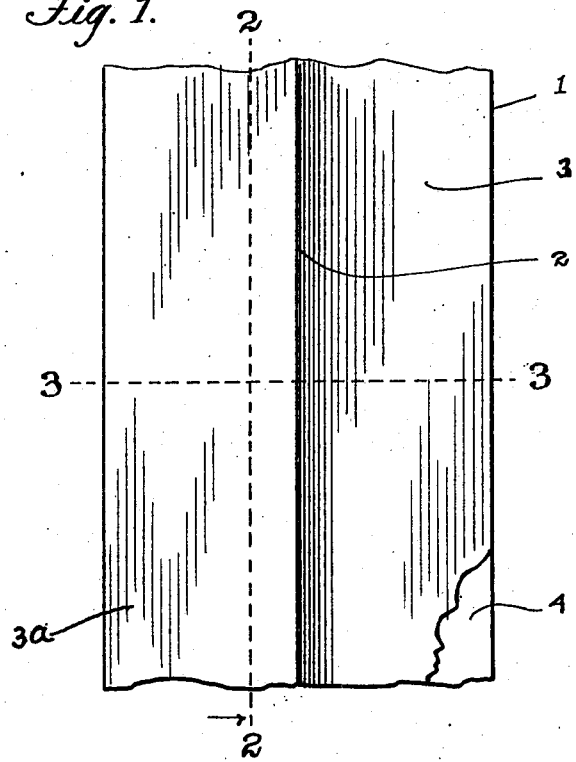
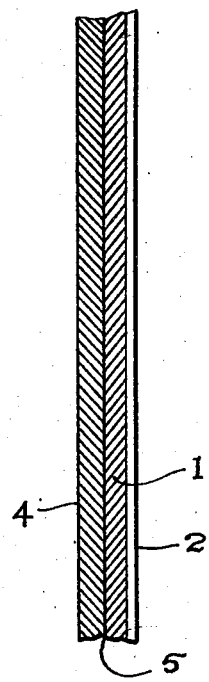
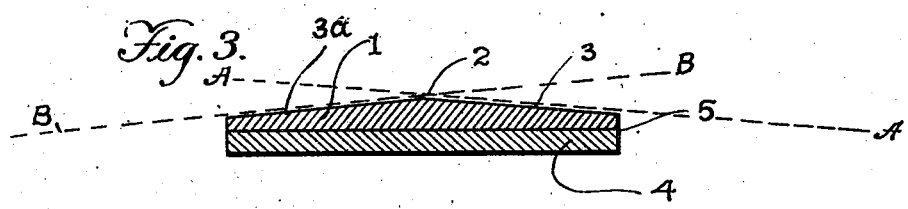
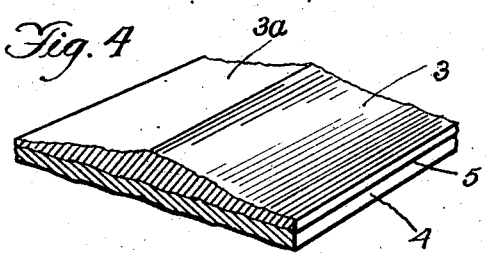
Inventor
Stephen M. Kellogg
Cyrus Kehr
Attorney.

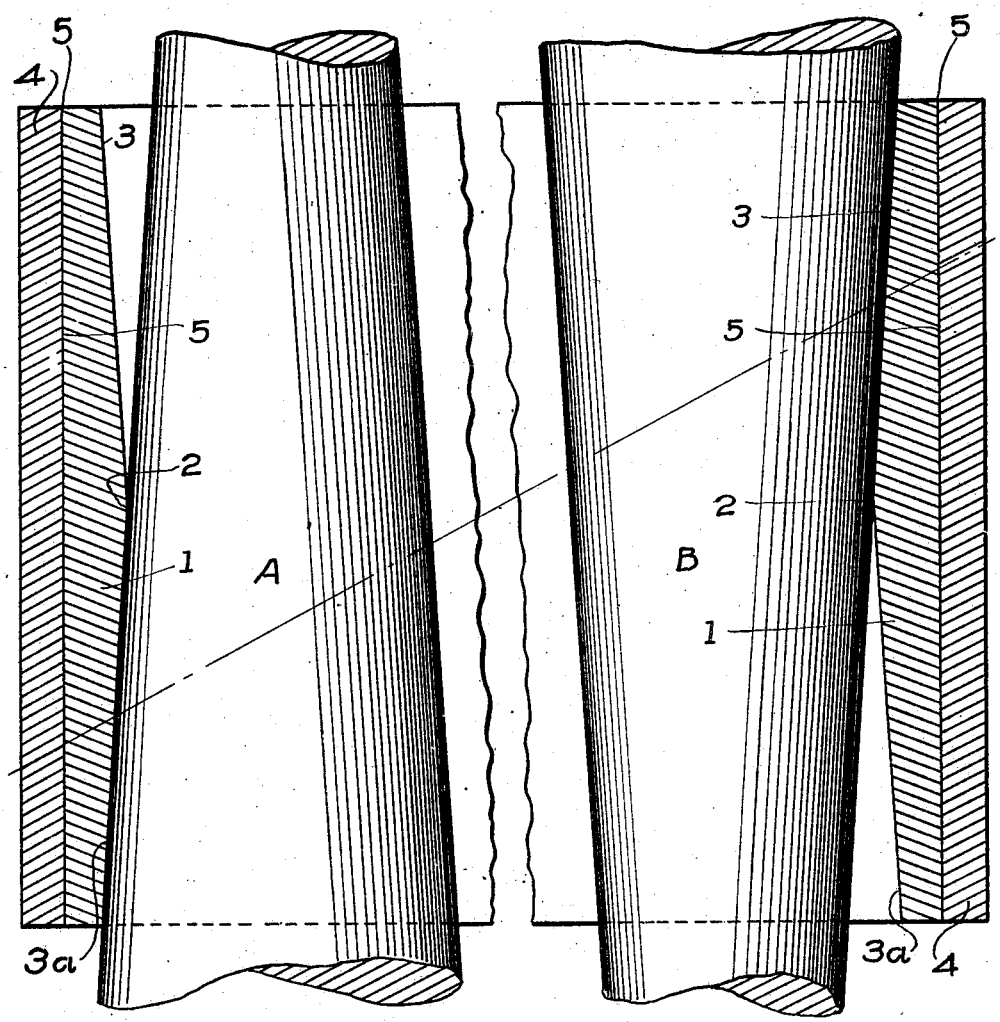

Patented Apr. 29, 1930

1,756,790

UNITED STATES PATENT OFFICE

STEPHEN M. KELLOGG, OF KNOXVILLE, TENNESSEE

DRIVING BELT FOR CONE PULLEYS

Application filed August 23, 1926. Serial No. 130,900.

This invention relates particularly to structures including a belt and a pair of cone pulleys for transmitting power from one such pulley to the other, the belt being shiftable sidewise on the pulleys to vary the ratio of rotation of the pulleys, as is already well known.

The object of this invention is to produce a belt in such form as will adapt it to make good engagement with the faces of the pulleys without placing objectionable strains on the belt. This is accomplished by making the belt in laminated form and giving one side of the belt two slanting faces as will be hereinafter described.

In the accompanying drawings,

Fig. 1 is a view looking perpendicularly at the inner or working face of a piece of a belt embodying my improvement;

Fig. 2 is a section on the line, 2—2, of Fig. 1, looking toward the right;

Fig. 3 is a transverse section on the line, 3—3, of Fig. 1;

Fig. 4 is a perspective of a piece of said belting.

Fig. 5 is a detail sectional view showing parts of a pair of cone pulleys and my improved belt applied thereto.

Referring to the drawings, 4 is a strip or sheet of leather or similar material. This constitutes the outer layer or lamina of the belt, the belt being preferably laminated. The inner layer, 1, is also composed of leather or similar material and is suitably joined to the layer, 4, as by means of glue, along the joint, 5. The outer side of this layer, 1, is formed with two slanting faces, 3 and 3ª, of substantially equal width and meeting along the line, 2, of the belt, the material being thick along said line and thinner toward the edges of the belt.

The face, 3, is to slant to conform to the slant of one of the pulleys, and the face, 3ª, is to slant to conform to the slant of the other pulley. The face, 3, is to make full contact and engagement with its pulley and the face, 3ª, is to make full contact and engagement with its pulley.

In Fig. 3, the line, A—A represents the face of the pulley which the face 3, of the belt is to engage; while the line, B—B, represents the face of the pulley with which the face, 3ª, is to make contact.

In accordance with the statement in the foregoing paragraph, the belt is applied to the cone pulleys, A and B, (Fig. 5) the face, 3ª, of the belt making contact with the pulley, A, and the face, 3, of the belt making contact with the pulley, B. In each case there is full contact of one half of the inner face of the belt. Thus one half of the inner face of the belt is used effectively for traction engagement.

When belts of uniform thickness are applied to a pair of cone pulleys, the thicker part of each pulley engaged by the belt tends to lift the corresponding edge of the belt away from the other pulley. Thus there is tendency to make full engagement between one edge of the belt and one pulley and between the other edge of the belt and the other pulley, the engagement of the belt at each pulley being reduced from one edge of the belt to the other, such reduction probably in many cases reaching substantial elimination.

As will be seen from the foregoing description, my improved belt makes full engagement with one pulley from one edge of the belt to the middle line, 2, of the belt and makes full engagement with the other pulley from the other edge of the belt to the middle line, 2, of the belt. In other words, one half of the working face of my improved belt makes full and complete engagement with one pulley while the other half of said working face makes full and complete engagement with the other pulley.

In the transmission of power at variable velocity by means of pairs of cone pulleys, this larger engagement with the pulleys is of much practical importance. There is more efficient operation. The transmission of load from the driving pulley to the driven pulley is more effective and more reliable and more uniform. This more effective engagement is adapted to successful operation with a belt which has less cross-section and is therefore cheaper. Furthermore, the strains to which my belt is subjected are of such balanced or distributed nature as to tend to prolong the lift of the belt. In this respect there is economy.

I claim as my invention,—

1. In a belt and pulley structure, the combination of a pair of cone pulleys and a belt applied to said pulleys, said belt having on its working or inner side and along its entire length two slanting longitudinal faces meeting approximately midway between the edges of the belt and one of said faces bearing on one pulley and the other face bearing on the other pulley.

2. In a belt and pulley structure, the combination of a pair of cone pulleys and a belt applied to said pulleys, said belt being composed of lamina and having on its working or inner side and along its entire length two slanting longitudinal faces meeting approximately midway between the edges of the belt and one of said faces bearing on one pulley and the other face bearing on the other pulley.

3. In a belt and pulley structure, the combination of a pair of cone pulleys and a belt applied to said pulleys, said belt having on its working or inner side and along its entire length two slanting longitudinal faces meeting approximately midway between the edges of the belt and the slant of one of said faces equalling the slant of one of the pulleys and bearing on said pulley and the other of said faces equalling the slant of the other pulley and bearing on said pulley.

4. A driving belt adapted to be applied to a pair of cone pulleys and having on its working or inner side and along its entire length two longitudinal faces meeting approximately midway between the edges of the belt and slanting toward the opposite side of the belt, whereby the belt tapers in cross section from approximately the middle of said cross section to each edge of the belt.

5. A driving belt composed of lamina and adapted to be applied to a pair of cone pulleys and having on its working or inner side and along its entire length two longitudinal faces meeting approximately midway between the edges of the belt and slanting toward the opposite side of the belt, whereby the belt tapers in cross section from approximately the middle of said cross section to each edge of the belt.

In testimony whereof I have signed my name, this 20th day of August, in the year one thousand nine hundred and twenty-six.

STEPHEN M. KELLOGG.